United States Patent
Salomons et al.

(10) Patent No.: US 7,899,302 B2
(45) Date of Patent: Mar. 1, 2011

(54) SYSTEM FOR MODIFYING THE TIME-BASE OF A VIDEO SIGNAL

(75) Inventors: Eduard Willem Salomons, Dublin (IE); Albert Maria Arnold Rijckaert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 922 days.

(21) Appl. No.: 10/538,611

(22) PCT Filed: Dec. 15, 2003

(86) PCT No.: PCT/IB03/05934

§ 371 (c)(1),
(2), (4) Date: Jun. 10, 2005

(87) PCT Pub. No.: WO2004/056126

PCT Pub. Date: Jul. 1, 2004

(65) Prior Publication Data

US 2006/0078300 A1  Apr. 13, 2006

(30) Foreign Application Priority Data

Dec. 16, 2002 (EP) .................................. 02080318

(51) Int. Cl.
*H04N 5/91* (2006.01)
*H04N 5/93* (2006.01)
(52) U.S. Cl. .......................................... 386/46; 386/52
(58) Field of Classification Search ................... 386/46
See application file for complete search history.

(56) References Cited

U.S. PATENT DOCUMENTS 6,031,960 A * 2/2000 Lane ........................... 386/68
6,973,258 B1 * 12/2005 Yoo et al. ................... 386/111
2003/0108338 A1 * 6/2003 Nonomura et al. ............ 386/95

FOREIGN PATENT DOCUMENTS

| EP | 1076461 A1 | 2/2001 |
| EP | 1137286 A2 | 9/2001 |
| EP | 1289306 A2 | 3/2003 |
| JP | 2001094943 A | 4/2001 |

* cited by examiner

*Primary Examiner* — Peter-Anthony Pappas
*Assistant Examiner* — Oluwaseun A Adegeye

(57) ABSTRACT

A storage device 500 includes an input 405 for receiving a digital video stream complying with a predetermined video encoding standard via a digital video communication system. The stream includes a sequence of digital video frames, a sequence of program clock reference stamps (PCR) and a sequence of video presentation time stamps (PTS). A time-base modifier 510 replaces the PTS's by respective modified video presentation time stamps (M-PTS) based on a constant predetermined frame time between successive presentation time stamps and replaces the PCR's by respective modified program clock reference stamps (M-PCR) by scaling the PCR's using a scaling factor that depends on a ratio of an expected time between a video presentation time stamp j and a preceding video presentation time stamp j−n and an actual time between the video presentation time stamp j and the preceding video presentation time stamp j−n, where j≧n>0. The expected time is n times the predetermined frame time.

13 Claims, 5 Drawing Sheets

SYSTEM FOR MODIFYING THE TIME-BASE OF A VIDEO SIGNAL

FIELD OF THE INVENTION

The invention relates to a system for modifying a time-base of a digital video stream; the system including an encoding device and a storage device connected via a digital video communication system, and a decoder/renderer. The invention further relates to a storage device and a time-base modifier. The invention also relates to a method of modifying a time-base of a digital video stream and to software for executing the method.

BACKGROUND OF THE INVENTION

Nowadays, most video signals have been recorded on tapes in an analog form. The quick uptake of digital video for playback, for example using DVD, has as a consequence that demand for recording video material on a digital recording medium also increases, for example using a recordable optical disc, like DVD+RW, or hard disc based recording devices. A commonly used digital encoding format is MPEG, in particular MPEG2. For recording an analog video signal, the user uses an analog reproducing device, such as a VCR and Camcorder to generate the analog video signal and uses an (MPEG) encoder to encode this signal to a digital format for storing on a digital storage medium. The MPEG encoder may be a stand-alone device, or integrated in another device, like the VCR, television, etc. Via a digital video communication system, such as the P1394 bus, the encoded signal can be supplied to a decoder/renderer or to a digital storage device for subsequent supply to a decoder/renderer. To enable decoding/rendering the encoded signal must comply with the encoding/transmission standard, such as MPEG. MPEG video encoding/transmission is, among others, described in International Standard ISO/IEC 13818-2: 1995(E) Information Technology; Generic coding of moving pictures and associated information: Video and International Standard ISO/IEC 13818-1: 1996(E) Information Technology; Generic coding of moving pictures and associated information: Systems. Especially timing of the stream of digital video is important. To this end, digital video encoding/transmission standards specify clock signals that enable clocks in the encoder and decoder to run in a synchronized manner. These clock signals will be referred to as program clock reference stamps (PCR). Additionally, timing signals are supplied for the individual frames to enable a rendering device to render the frames at the correct time. These timing signals will be referred to as presentation time stamps (PTS). Moreover timing signals can be present that indicate to the decoder when the MPEG decoding can start. These signals will be referred to as decoding time stamps (DTS). The analog or digital video signal supplied to an encoder in addition to the video signal also includes a frame signal (vsync) that indicates frame boundaries in the video signal. The frame signal is thus synchronous with the video frames. The PTS signals in the encoded stream are usually inserted in the encoded video stream synchronous with the arrival of the vsync signal.

For MPEG2 transmission as specified for DVB (Digital Video Broadcast), the timing for the PCR and PTS are based on a same clock with a defined frequency and tolerance. For example, the clock defined by MPEG runs at 27 MHz. and should deviate less than 30 ppm (parts per million). Usually, the frame rate of a video signal is 25 Hz. or 30 Hz. and the vsync pulse has the same frequency. A straightforward conversion of an analog video signal having a frame rate of exactly 25 Hz. will result in an MPEG stream with PTS values present once every 40 ms. However, the deviation of the frame rate of a video signal reproduced with analog reproducing devices may be up to 100 ppm. To be able to obtain a digital video signal which has a PTS once every frame period, the MPEG encoder could be locked to the vsync of the video input signal. The encoded digital video signal thus obtained will have a PCR which deviates 100 ppm and is therefore not MPEG compliant. Such an encoded video stream should not be supplied through a network to a decoder/renderer as the decoding device may not be able to decode the signal. On the other hand, directly using the MPEG clock and ignoring too large deviations in frame rate may result in rendering problems, such as having to skip or repeat frames.

SUMMARY OF THE INVENTION

It is an object of the invention to provide a system that enables a user to render an encoded video signal in real-time, possibly with a loss in quality, whereas the signal can be perfectly reproduced after having been recorded by a storage device.

To meet an object of the invention, a system for modifying a time-base of a digital video stream includes an encoding device and a storage device connected via a digital video communication system, and a decoder/renderer;

the encoding device including: an input for receiving an input video signal, and an input frame signal (vsync) synchronous to and indicating frame boundaries in the input video signal; an encoder for converting the input video signal and input frame signal to a corresponding digital video stream complying with a predetermined video encoding standard; the encoder including a encoder clock complying with the video encoding standard; the digital video stream including: a sequence of digital video frames corresponding to received input video frames; a sequence of program clock reference stamps (PCR) representing a clock signal of the encoder clock; and a sequence of video presentation time stamps (PTS) each associated with a respective digital video frame and representing a value of a counter driven by the clock signal at a moment of receipt of an input video frame that corresponds to the digital video frame; and an output for providing the digital video stream via the digital video communication system;

the storage device including: an input for receiving the digital video stream via the digital video communication system; a time-base modifier operative to replace the video presentation time stamps (PTS) by respective modified video presentation time stamps (M-PTS) based on a constant predetermined frame time between successive presentation time stamps; and to replace the program clock reference stamps (PCR) by respective modified program clock reference stamps (M-PCR) by scaling the program clock reference stamps (PCR) using a scaling factor that depends on a ratio of an expected time between a video presentation time stamp j and a preceding video presentation time stamp j–n and an actual time between the video presentation time stamp j and the preceding video presentation time stamp j–n, where j≧n>0, and the expected time is n times the predetermined frame time;

a storage for storing at least a part of the time-base modified video stream; and an output for providing a video stream from the storage device to the decoder/renderer; and the decoder/renderer including an input for receiving a video stream from the storage device and being operative to decode the video stream received from the storage device to enable rendering of the digital video frames in the stream synchronous with the respective associated modified video presentation time stamps.

In the system according to the invention, the encoded video stream fully complies with the video encoding standard with respect to timing requirements for PCR and PTS. As such, a standard decoder/renderer that receives the stream through a communication interface can decode and render the stream in real-time, albeit at a possible loss of quality since the decoder may occasionally need to skip a frame (if the actual frame rate of the input video signal is higher then the maximum allowed deviation) or repeat a frame (if the actual frame rate of the input video signal is lower then the maximum allowed deviation). All video frames are present in the stream. A storage device is used to record frames of the stream. The frames can be supplied from the storage at a corrected frame rate that falls within the tolerances defined by the video encoding standard. To this end, the time base is scaled by comparing the actual frame times with the expected frame times. The actual frame times are derived from the PTS. The expected frame times are fixed, e.g. 40 msecs. between successive frames for a 25 Hz. system and thus the expected frame time between frames j−n and j that are sequentially n frames apart (n>0) is n×40 msecs. for such a frame rate. The actual frame time between those frames is determined by PTS[j]-PTS[j−n] (after conversion of a clock number to a corresponding duration). Comparing the actual frame times to the expected frame times gives a scaling factor. The PCR values can be scaled using this factor. Similarly, also the DTS values should be scaled if they are present. After this scaling, the offset between successive PTS values should correspond to the fixed frame time. Scaling may be done on two immediately successive PTS values (in this case n=1), giving a highly dynamic adjustment. Scaling may also be done on a larger time, e.g. 5 frames apart (n=5) or even all frames since the start (n=j, if the first frame is numbered 0). The storage acts as a buffer to compensate for the differences in actual frame rate and the constant desired frame rate of the encoding standard. Such a buffer needs to be substantially larger than required for jitter compensation as defined by the video encoding standard. The time-base correction according to the invention can be performed using a digital filter that calculates the modified PCR values.

According to an embodiment the time-base modifier includes a clock unit operative to generate a clock signal locked to the received video presentation time stamps (PTS) using an error signal that depends on the scaling factor; the time-base modifier being operative to obtain the modified program clock reference stamps (M-PCR) by sampling a counter driven by the clock signal at a moment of receipt of the program clock reference (PCR). By locking the clock to the PTS signal, the clock signal is automatically scaled to the actual PTS signal compared to a PTS signal that is based on a constant, standard-defined frame rate. The scaled clock can be used to replace the original PCR signal.

According to an embodiment the received video presentation time stamps are low-pass filtered and the clock unit is locked to the filtered video presentation time stamps. In this way, high frequency jittering is removed, providing a more stable time-base correction. Alternatively, according to the measure of the dependent claim 4, the time-base modifier is operative to low-pass filter the scaling factor.

According to an embodiment, the digital video stream includes information on a nominal frame rate of the video signal and the time-base modifier is operative to derive the predetermined frame time from the digital video stream. The MPEG transport stream already includes this information (indicated by the so-called frame rate code in the sequence header). In this way, the time-base modification can be used for differing frame rates without a user having to configure the frame rate.

According to an embodiment, the input of the encoding device is operative to receive an analog audio signal; the encoding device further including a sampler for sampling the received analog audio signal under control of a sampling clock signal that is derived from the video input signal and locked onto the input frame signal (vsync); and wherein the encoder is operative to convert the sampled audio signal into a time sequence of corresponding audio frames and insert the audio frames and respective audio presentation time stamps (A-PTS) in the digital video signal stream. In this way, the audio signal is sampled synchronous to the video signal, enabling synchronous reproduction by a decoder/renderer that decodes the stream in real-time.

According to an embodiment, wherein the time-base modifier is operative to replace the audio presentation time stamps (A-PTS) by modified audio presentation time stamps (MA-PTS) by scaling the audio presentation time stamps (A-PTS) using the scaling factor. The encoded audio signal is scaled in the same way as the video PCR (thus depending on the scaling determined for the video signal). In this way, after reproduction from the storage, the audio signal can still be reproduced synchronous to the video signal.

According to an embodiment, the storage device is operative to time stamp each packet of the digital video stream on receipt of the packet; to store each time stamp in the storage in association with the corresponding received packet; and to output packets of the stored stream according to the respective time stamps and a predetermined delay. By time stamping each packet, the storage device can issue the packets from storage at the desired instants.

According to an embodiment, the storage device includes a clock for providing timing signals and the storage device being operative to use as the time stamps stored in the storage the timing signal scaled using the scaling factor. The storage time stamps are thus scaled in the same way as the video PCR time stamps. In this way, packets that do not have a PCR value can still be released from the storage at the corrected time.

According to an embodiment, the storage device is operative to use as the time stamps stored in the storage a counter value from a counter driven by the clock signal locked to the received video presentation time stamps (PTS). In this way, the already scaled PCR signal is also used to time stamp packets that do not have a PCR value, giving an accurate time for releasing the packets from storage.

According to an embodiment, the video encoding standard is MPEG2. This encoding/transmission standard is widely supported.

According to an embodiment, the digital video communication system includes an isochronous communication channel for transferring the digital video stream. This gives a reliable transmission of the video stream. Preferably, IEEE1394 or USB are used.

These and other aspects of the invention are apparent from and will be elucidated with reference to the embodiments described hereinafter.

DETAILED DESCRIPTION OF THE PREFERRED EMBODIMENT

Figure 1:
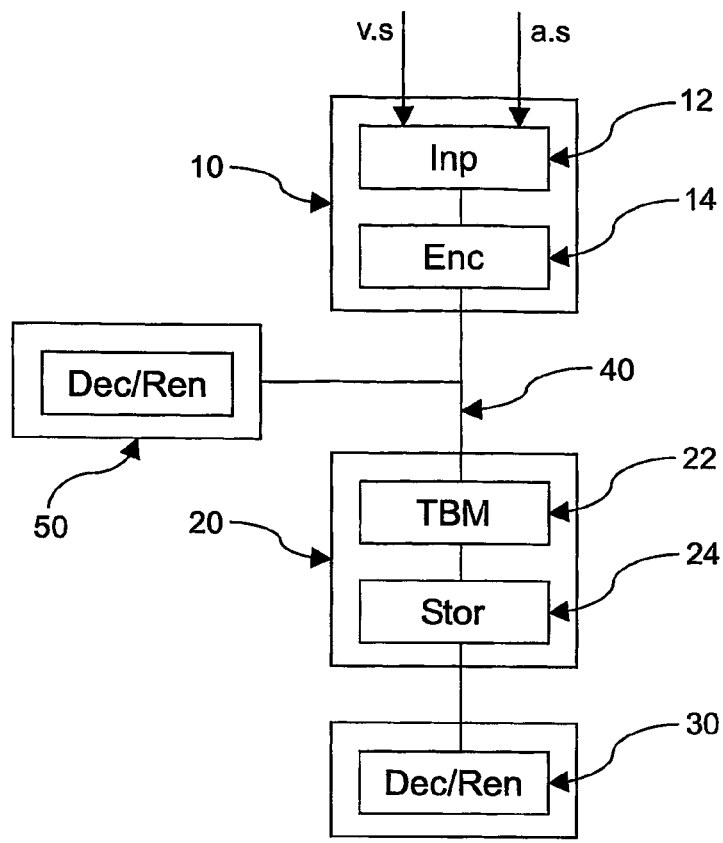
FIG. 1 shows a block diagram of the system according to the invention.

FIG. 1 shows a block diagram of the system according to the invention. The system includes an encoding device 10, a storage device 20 and a decoder/renderer 30. The encoding device 10 includes an input 12 for receiving at least one video signal. In the example of FIG. 1, it receives a video signal v.s. and an audio signal a.s. The encoding device 10 also includes an encoder 14 for encoding the AV signal(s) to an encoded stream for supply to at least the storage device 20 via a digital communication system 40. The encoding and transfer is according to a predetermined encoding standard. In a preferred embodiment, it complies with MPEG2. However, persons skilled in the art will be able to apply the principles also to other encoding/transmission formats. Any suitable communication system may be used. To enable stream-wise pushing of the data, the communication system preferably provides at least one isochronous communication channel. Suitable communication systems include, but are not limited to, USB and, in particular, EEE 1394 (also known as Firewire or iLink). By using standardized encoding/transmission, the stream transferred from the encoder to the storage device can also be supplied to a decoder/renderer 50 for real-time rendering. The decoder/renderer 50 may be connected to the same channel 40 or to an additional channel (not shown). In FIG. 1, the decoder/renderers 30 and 50 are each shown as one block. It will be appreciated that such functionality may equally well be divided into separate devices.

The encoding device 10 may be a stand-alone device but may also be integrated with other functions. For example, the encoding device 10 may be part of a television, set-top box (STB), or personal computer (PC). In particular, the encoding device 10 may be integrated in a source device of the AV signal, such as a VCR or Camcorder.

The storage device 20 includes a time-base modifier 22 and a storage 24. The storage 24 is used for storing at least part of the time-base modified video stream. The storage 24 acts at least as a buffer to compensate for the difference in frame rate of the video signal coming into the encoding device and being output from the storage device. For example, with a 0.5% difference in rate, the storage should be able to minimally store at least 0.5% of a video title in the situation where supply of the video title from the storage is started immediately. Preferably, the storage 24 is able to store at least one average size video title in full to enable later decoding/rendering at a time desired by a user. The storage 24 may be a removable type of storage medium, such as DVD+R, DVD+RW, DVD-RW, DVD-RAM, DVHS, Blu-ray disc, solid state memory, etc. Preferably, the storage 24 is a high capacity storage, such as a hard disc, capable of storing several average size video titles in full.

Encoding Device

Figure 2:
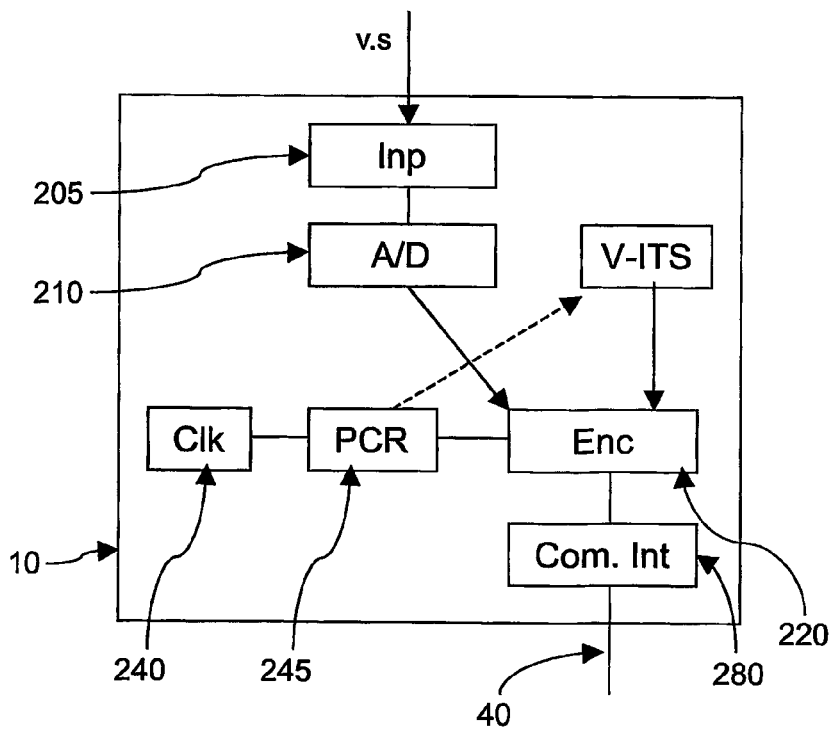
FIG. 2 shows an embodiment of an encoder according to the invention.

FIG. 2 shows an exemplary block diagram of the encoding device. In this example, the encoding device includes an A/D converter 210 for sampling a video signal v.s. received through an input 205 and converting it to a digital representation. The incoming video signal has an associated vclk clock signal (typically 27 MHz.). The sampling is line locked to this clock signal. The incoming video signal also includes a vsync pulse (typically 25 Hz. Or 30 Hz.) that marks the start of a new video frame. The digitized video data and the vsync signal are supplied by the A/D converter 210. The encoding device further includes an encoder 220 and an encoder clock 230. The encoder clock 230 is free running according to the requirements of the video encoding/transmission standard. For MPEG, the encoder 230 is clocked from a crystal, which delivers a very precise 27 MHz signal (must be 27 M +/−30 ppm according to the MPEG standard). The clock signal is used to increment a counter 245. The PCR time-base counter (Program Clock Reference) is directly derived from this main encoder clock. PCR is thus a counter value. Using the predetermined frequency, a difference in counter values can also be expressed in a time difference. To simplify examples, in the remainder sometimes differences between PCR's will be expressed in time instead of the actual difference in counter values. The same holds for other counters/time-stamps, such as PTS. In the embodiment of FIG. 2, each time a new video frame arrives at the video input 205, a time stamp V-ITS (Video Input Time Stamp) is created by sampling the clock counter value. Some or all of these time stamps will be reflected in the digital video stream via the communication system 40 in the form of the PTS-Presentation Time Stamp. PTS specifies to an encoder/renderer when the associated video frame should be supplied for rendering. The PTS value is thus the 'same' as V-ITS with a fixed delay representing the delay in the entire processing chain. To be able to communicate via the communication system, the encoding device 10 includes a communication interface 280. Hardware and/or software for such interfaces are well-know and will not be described here further.

In the system according to the invention it is allowed that there is a disturbance in the source, in the sense that the line locked (27 MHz) clock has a lot of jitter on a line by line basis (but is locked on a frame basis), and that the frequency of the vsync signal deviates considerably from the expected value (e.g. 24.5 Hz. instead of 25 Hz.). Such a situation may, for example, occur when the input signal of the encoding device is received from a VCR at playback (or even worse: trick-mode).

Figure 3:
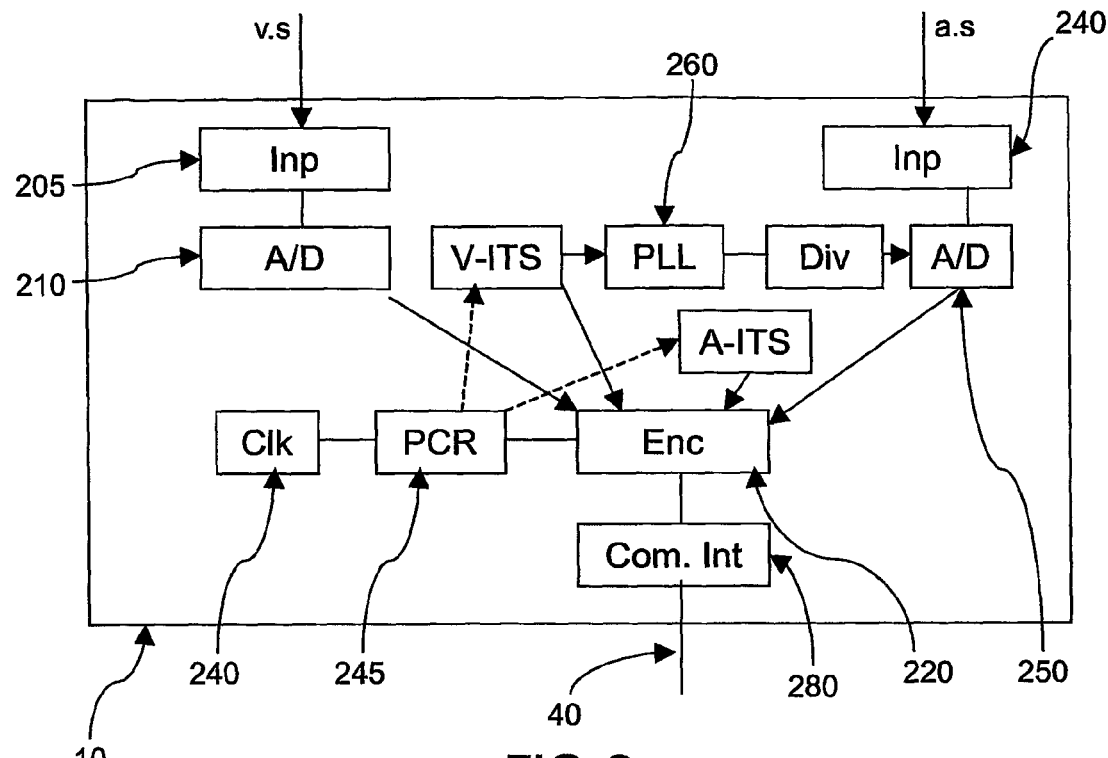
FIG. 3 shows a further embodiment of an encoder.

In an embodiment as is illustrated in FIG. 3, in addition to a video input signal v.s., the encoding device also has an input 240 for receiving an audio signal a.v. In this example, the audio signal is still analog. The encoding device thus includes an A/D converter 250 for sampling the audio signal a.s. and converting it to a digital representation (stream of audio frames/packets). In principle a free running sampling clock, running at for example 48 KHz. could be used. However, to keep the audio synchronous to the video, also after during fluctuations in the timing of the video signal and after time-base correction of the digital video stream, in a preferred embodiment, the audio sampling clock signal is derived from the video input signal and locked onto the input frame signal (vsync). In the example of FIG. 3, this is achieved by using a PLL (Phase Locked Loop) 260 locked to vsync. The clock supplied by the PLL is divided to the frequency required for the audio sampling (e.g. dividing the clock frequency by a factor of 27 MHz./48 KHz.=562.5). The audio frames/packets are also time stamped on receipt using associated A-ITS (Audio Input Time Stamps). Similar to what was described for the video, some or all of these A-ITS values may be represented in the video stream in the form of respective audio presentation time stamps (A-PTS) to steer the supply of the audio from the decoder/renderer.

It will be appreciated that there may be more than one video input signal and that there may also be several audio signals (e.g. stereo, multi-channel, different languages, etc.). Sampling/time-stamping of each of these signals is preferably synchronous to vsync of the main video signal. The various resulting streams of digital packets may be multiplexed into one transport stream by the encoder 220. Multiplexing/demultiplexing is well-known and will not be described here any further. The encoder 220 (or more precisely, the multiplexer of the encoder) inserts samples of the PCR time-base into the stream. The PCR values may be inserted at fixed intervals, e.g., every 40 msec. In reality, most encoding/transmission standards only define a maximum offset that is allowed between immediately successive PCR's. For example, DVB specifies that at least once per 40 msec. a PCR value must be inserted. Typically, PCR values are not inserted at regular intervals. In a decoder/renderer, such as shown in FIG. 1 using numbers 30 and 50, the received values of the PCR are used to reconstruct the encoder PCR counter. In this way, the decoder clock runs synchronous to the encoder clock. Consequently, frames can be issued at the right time, using its PTS value. Transmission standards define a maximum deviation in the clock signal used for creating the PCR's to guarantee that all decoders can reconstruct the clock signal. According to MPEG, the decoder may not be able to reconstruct the PCR counter if the PCR clock is outside the MPEG specifications of 27 MHz +/−30 ppm. Since the encoding device fully complies with the involved standard, it can be assumed that the reconstruction is perfect, i.e. the PCR counter in the decoder is a copy of the PCR counter in the encoder.

Because of the fact, that the video vsync is not locked to the main encoder clock, the difference between the PTS's of two successive video access units is generally not precisely equal to the expected 40 ms (in the example of 24.5 Hz it is larger). Similarly, the difference between 2 audio access units will generally not be precisely equal to the expected value, because the audio clock is also not locked to the PCR clock. In the decoder, the PTS's that are coded in the stream are used to determine the presentation time of access units in relation to the value of the reconstructed PCR counter. In practice artifacts may occur in decoder/renderers. For example, a conventional decoder/renderer may use a single clock, locked to the incoming PCR, for audio and video decoding. It may start decoding of audio/video access units at an expected pace, independent from the precise PTS values that are in the stream. For example, for PAL the decoder may start decoding a new frame after every 40 ms of the PCR clock. Before decoding of a particular frame, the decoder will then check whether or not its PTS is still within a distance of ½ frame period from the really used decoding time $T_{dec}$ ($T_{dec}$ follows from the assumed fixed-pace decoding). If not, the decoder makes the following correction:

IF ($T_{dec}$−PTS>½ frame_period) THEN skip_access_unit;

IF ($T_{dec}$−PTS<−½ frame_period) THEN repeat_access_unit;

In this way, the decoder still effectively locks the presentation times to the PTS's, but artifacts will occur at regular times if the audio and video were not already locked to the PCR. Nevertheless, the incoming signal is precisely reconstructed: all audio/video packets are there. However, the decoder will have to skip and/or repeat access units for rendering. The system according to the invention overcomes this problem.

Storage Device

Figure 4:
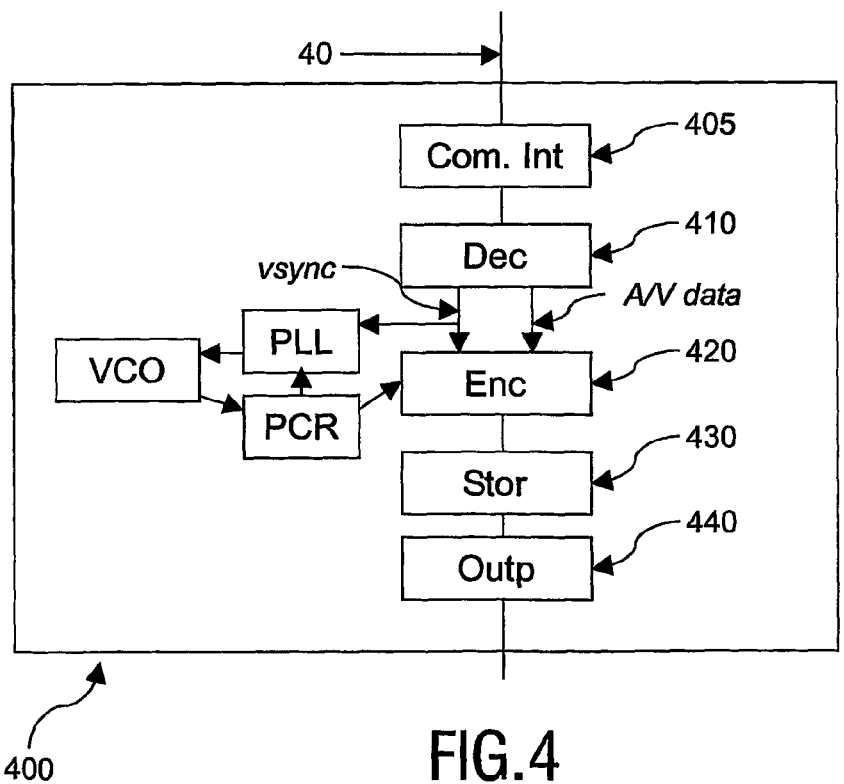
FIG. 4 shows a block diagram of a conceptual recoder.

FIG. 4 illustrates the solution in a conceptual way, using a storage device 400 (same as storage device 20 of FIG. 1) acting as a recoder. To explain this, the storage device is assumed to contain a (e.g., MPEG) decoder 410 and an additional encoder 420. The encoded input stream received via the communication system through a communication interface 405 is fully compliant with the encoding/transmission standard as described above. Note, that the audio and video PTS's are again derived by adding a constant delay to the ITS's. The ITS's are samples of the PCR time-base, so they are also derived from the precise clock at, for example, 27 MHz.

In the storage device, the received signal is decoded by a (conceptual) decoder 410. Because of the compliant input stream, the decoder 410 is able to exactly reconstruct the signal as it came into the encoder of the original encoding device, e.g. number 10 of FIG. 1. This means that also the vsyncs that are produced by the decoder based on the PTS's are a copy of the vsync as it came into the original encoder. Inside the storage device, there now is a second (conceptual) encoder 420, which re-encodes the decoded signal, thereby locking its time-base to the incoming vsyncs. In the embodiment of FIG. 4 the locking is achieved using a PLL and VCO (Voltage Controlled Oscillator). The VCO drives the modified PCR counter used by the encoder 420. The stream that comes out of this encoder 420 contains all A/V data, but its time-base has changed. By storing it in storage 430 and playing it back from the storage at the modified time-base, a fully compliant signal with new time-base is achieved.

In practice, it is not required to use a full-blown decoder 410 and encoder 420 in the storage device 400. In fact, the actual A/V packets are not changed at all and, thus, do not need to be decoded and re-encoded. Only, the main time base, defined by the PCR's is changed and all stream fields that depend on it. In particular, Presentation Time Stamps (PTS) and, if present, Decoding Time Stamps (DTS). Thus, the same can be achieved using some additional processing on incoming PTS and PCR timestamps. This processing may be done using only software executed on a processor, such as a microcontroller or digital signal processor. Such processing may be done in real-time or off-line. As an alternative to full software-based processing, partial hardware support may be used as will be described below in more detail.

Figure 5:
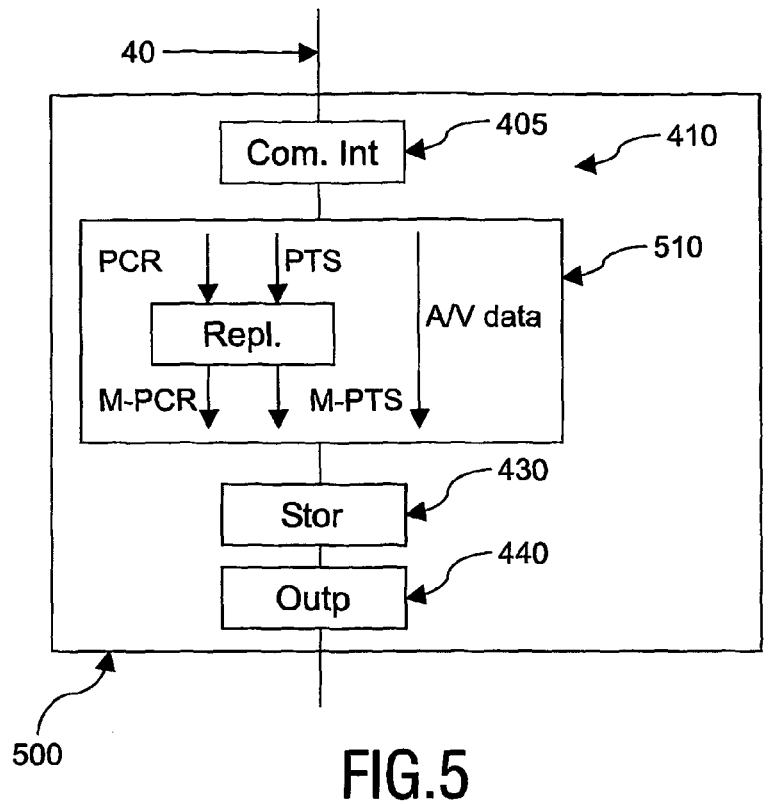
FIG. 5 shows an embodiment of the storage device.

FIG. 5 illustrates that according to the invention, the time-base modifier 510 in the storage device 400 scales the time-base (i.e. PCR's) such that the modified PTS's have values reflecting a constant predetermined frame-time between successive frames. In this figure, same reference numbers as used in FIG. 4 refer to the same features. For a 25 Hz. system, the predetermined frame-time is 40 msecs. It should be noted that not all frames need to have a PTS. So, successive PTS's may have values reflecting a multiple of the frame-time. In the examples below, it is assumed that each frame is associated with a respective PTS to simplify the description. Thus, the time-base modifier replaces the video presentation time stamps (PTS) by respective modified video presentation time stamps (M-PTS) based on the constant predetermined frame-time between successive presentation time stamps. For example, numbering the successive PTS's using an index j, $M\text{-}PTS[j+1]=M\text{-}PTS[j]+\text{frame-time}$, or $M\text{-}PTS[j]=PTS[0]+j\times\text{frame-time}$ The time-base modifier replaces the program clock reference stamps (PCR) by respective modified program clock reference stamps (M-PCR) by scaling the program clock reference stamps (PCR) using a scaling factor that depends on a ratio of an expected time delay between a video presentation time stamp j and a preceding video presentation time stamp j−n and an actual time between the video presentation time stamp j and the preceding video presentation time stamp j–n, where j≧n>0, and the expected time is n times the predetermined frame-time. The period over which the scaling extends, reflected by n, may be chosen. In one extreme, n=j. In such a case, the scaling factor at the time of PTS[j] is given by:

(n×frame-time)/(PTS[j]−PTS[0]), where PTS[j] represents the time of the j-th PTS based on its counter value. As more PTS's are received the intervals increase and the scaling factor gets more stable. In another extreme, the scaling factor is highly dynamic based on the actual time in between two immediately successive PTS's (n=1). In such a case, the scaling factor at the time of PTS[j] is given by:

frame-time/(PTS[j]−PTS[j]−PTS [j−1])).

Also other choices for n may be made (e.g. n=5 PTS periods). In the remainder an example will be given for n=j. Persons skilled in the art will be able to apply the same technique for other values of n.

For each received PTS (indicated as recPTS with index between bracket [ ], an expected PTS (indicated as expPTS) is determined with which the received value is compared. For initialization, the first expected PTS is set equal to the first received PTS:

expPTS[0]=recPTS[0]

All following expected_PTS's are calculated by adding the constant frame-time to the previous expected_PTS:

expPTS[$j$+1]=expPTS[$j$]+frame-time, $j$>0.

For example for a PAL video system, a new expPTS is always set 40 ms higher than its predecessor.

For each received PCR value PCR[k] in the transport stream, a target T[k] is derived as:

$$T[k]=(PCR[k]-PCR[0])\times scalingfactor+PCR[0] \quad (1)$$

where $$scalingfactor = \frac{expPTS[j] - expPTS[0]}{recPTS[j] - recPTS[0]} = \frac{j \times \text{frame-time}}{recPTS[j] - recPTS[0]} \quad (2)$$

where k denotes the index of the received PCR and j corresponds to the number of PTS values received before the PCR value. The value of j must be bigger than 0 before the algorithm can start working. The target T[k] can now be used as the modified PCR, indicated as MPCR:

MPCR[k]=T[k]

Similarly, the modified PTS, indicated by MPTS, is fully corrected and is thus given by:

MPTS[j]=expPTS[j].

Typically, there will be more PCR samples than PTS samples in a stream. This leaves the question what j (index for PTS) should be used for modifying a PCR indicated by index k. Particularly, if the modification is real-time, it will be clear that the scaling factor has to be known before the scaling of PCR can take place. To optimally reflect a recent change, preferably a given PCR is modified based on a scaling factor derived from at least the immediately preceding PTS. Since there may be more PCR samples then PTS samples, there may be several PCR samples that are modified with the same scaling factor. For off-line correction, the same principle can be applied. However, in such a case a scaling factor determined based on PTS[j] and PTS[j−n] can also be used for correcting PCR samples that lie within this interval.

Above algorithm shows that the modified clock base can be calculated off-line (i.e. non-real-time) or real-time without really reconstructing a time signal.

Figure 6:
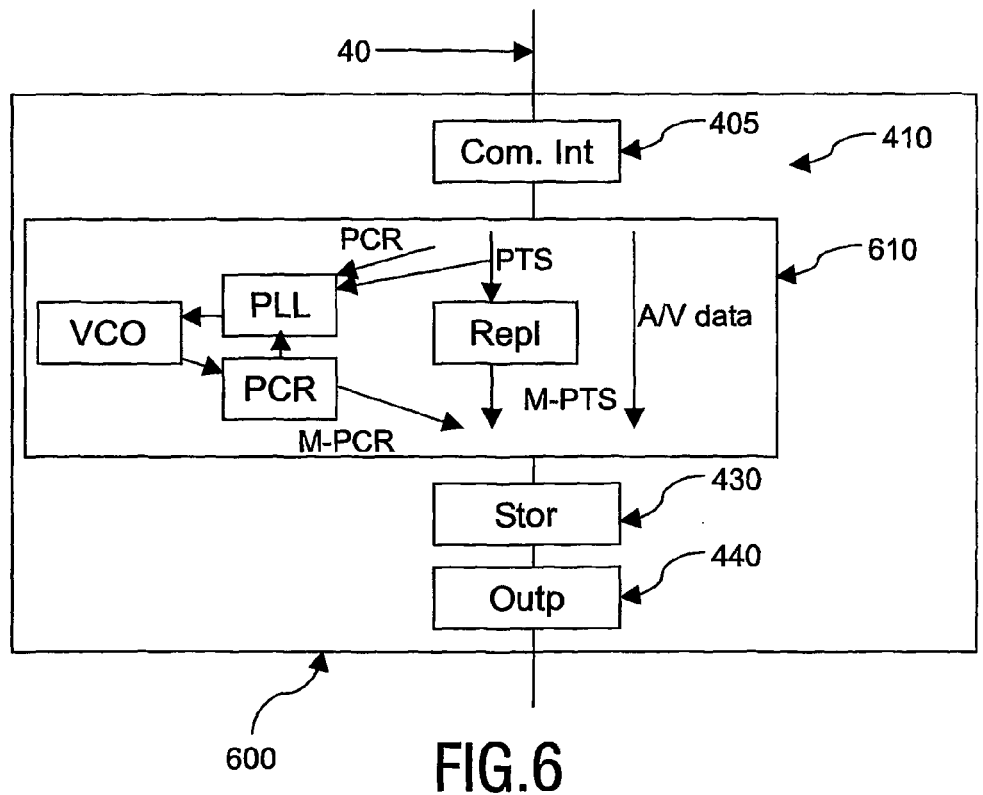
FIG. 6 shows an alternative embodiment of the storage device.

In an alternative embodiment, as shown in FIG. 6, the time-base modifier 610 reconstructs a scaled time signal using a PLL. Same reference numerals as used in FIGS. 4 and 5 refer to same functions. To steer the PLL, an error signal E is derived as:

$E[k]$=time-base$[k]$−$T[k]$, where time-base[k] is the sample of the time-base counter that was taken when receiving PCR packet k. As a start-up the following can be used:

time-base[0]=PCR[0]

All the calculations, including the division in the scaling factor do not have to be very precise, since the result is only used to steer the PLL. Note, that the Equation (1) in essence aims at locking the PLL to the average frame-time (running average from frame 0 to frame j).

In a preferred embodiment, a low-pass filtered version of the frame-time is used to lock the PLL. This may be done in any suitable way. For example, the time-base modifier may low-pass filter the received video presentation time stamps and the clock unit is locked to the filtered video presentation time stamps. Alternatively, the time-base modifier low-pass filters the scaling factor of equation (2).

The error signal E is used by the PLL to modify the frequency of the main encoder clock (e.g. 27 MHz clock). If E>0 then the frequency is decreased, if E<0 then the frequency is increased. The goal of the PLL is to control the error signal to zero.

Figure 7:
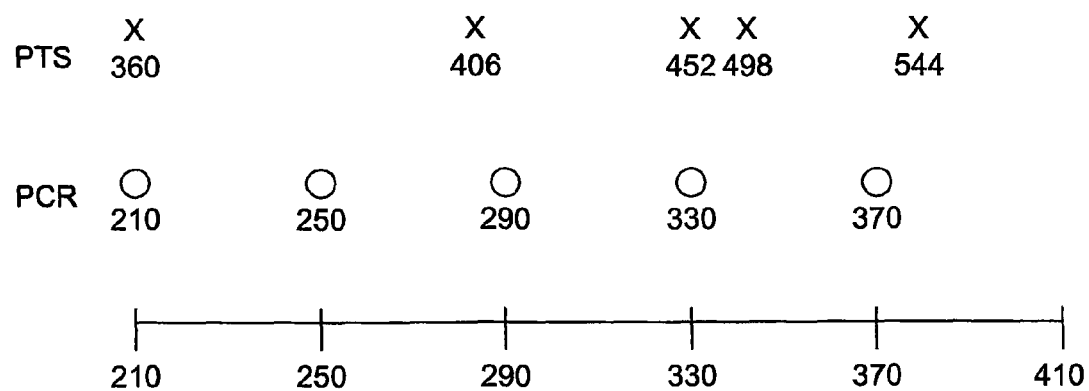
FIGS. 7 and 8 illustrate the adjustment to the time-base.

That above mentioned approach indeed leads to a lock onto the vsync can be understood by using an example that shows the start-up behavior of the PLL. In FIG. 7 the timing of a received transport stream is depicted which contains video frames that originally came into the encoder at 21.7 Hz (=1/0.046). It should be noted that this is an exceptionally low frequency, used to illustrate the concept. The x-axis shows the real time, which for the example is assumed to correspond to the time according to the precise 27 MHz time-base in the encoder. In the example, PCR values are present at regular intervals once every 40 ms. In reality, this may not be the case. The first PCR value corresponds to a time of 210 ms, and since the encoder is assumed to use a perfect time-base, the values in the PCR packets are the same as the time at which they are received. Several (e.g. 5 or 12) PTS values may be present in the stream per MPEG GOP (group of pictures). However, at what time these PTS values are received depends on the sizes of the particular frames in the GOP. E.g. since the first frame (=I-frame) is normally the largest, the difference in receival time between the first and second PTS in the stream is normally relatively large. The values of the PTS timestamps depend on the time at which the corresponding frame was received at the input of the encoder. In the example, each successive PTS has a value that corresponds to 46 msecs. later than its predecessor. The value of the first PTS is chosen in the encoder according to the desired vbv_delay.

Figure 8:
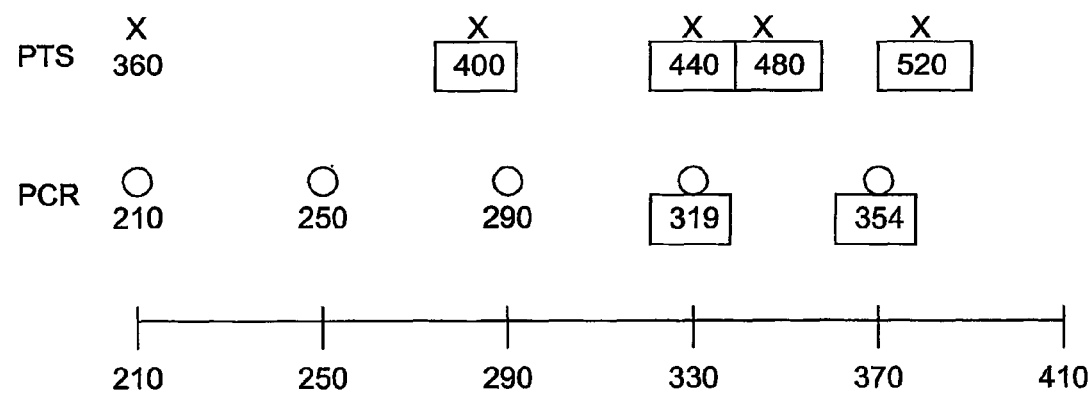

In FIG. 8, the timestamps that are modified according to the above mentioned algorithm are shown in boxes. Furthermore the value of the PLL error signal E[j] is shown. As can be see in the figure, all PTS's are overwritten by their expected value (with a fixed frame-time of increase per frame, e.g., 40 ms). The PLL error signal can only be calculated after 2 PTS values are received (j=1). Until then the error signal is 0 and the VCO runs at an uncorrected 27 MHz. The first error signal unequal to 0 is calculated at t-290 ms. Before that time, the PCR is overwritten by a free running time-base (for now we assume again that this time-base runs exactly at 27 MHz), so that the PCR is not changed. In the example, the calculation is again in actual time and not in corresponding clock values. The target T[2] for PCR[2] at t=290 equals:

$$scalingframe = \frac{j \times frametime}{recPTS[j] - recPTS[0]} = \frac{1 \times 40}{406 - 360} = 0.87$$

$$T[2] = (PCR[2] - PCR[0]) \times scalingfactor + PCR[0] =$$
$$(290 - 210) \times 0.87 + 210 = 279.6 \text{ msec}$$

Thus:

MPTS[j]=360+j×40, for j>0

Using a locked PLL, the error signal equals

E=290−279.6=10.4 ms

Because of this positive error signal, the PLL will slow down the clock. For the next PCR packet, this will lead to a reduced error. For example, the PLL may be controlled in a proportional manner, where its frequency f is given by:

$$f = f_0 \times \left(1 - \frac{E}{40}\right), f_0 = 27 \text{ MHz}.$$

Then:

MPCR[3] =

$$MPCR[2] + (PCR[3] - PCR[2]) \times \left(1 - \frac{E}{40}\right) = 290 + 40 - E = 319.6$$

and $$MPCR[4] = MPCR[3] + (PCR[4] - PCR[3]) \times \left(1 - \frac{E}{40}\right) =$$
$$319.6 + 40 - E = 319.6 + 40 - 5.3 = 354.3$$

The corresponding target is:

T[4]=(PCR[4]−PCR[0])×scalingfactor+PCR[0]=
(370−210)×(480−360)/(498−360)+210=349.1     (1)

The error is then:

E[4]=time-base[4]−T[4]=354.3−349.1=5.2.

Using this proportional arrangement, the final error is reached if f=40/46×f$_0$. In this case:

$$\frac{40}{46} \times f_0 = f_0 \times \left(1 - \frac{E}{40}\right)$$

$$1 - \frac{E}{40} = \frac{40}{46}$$

$$E = 5.2$$

Figure 9:
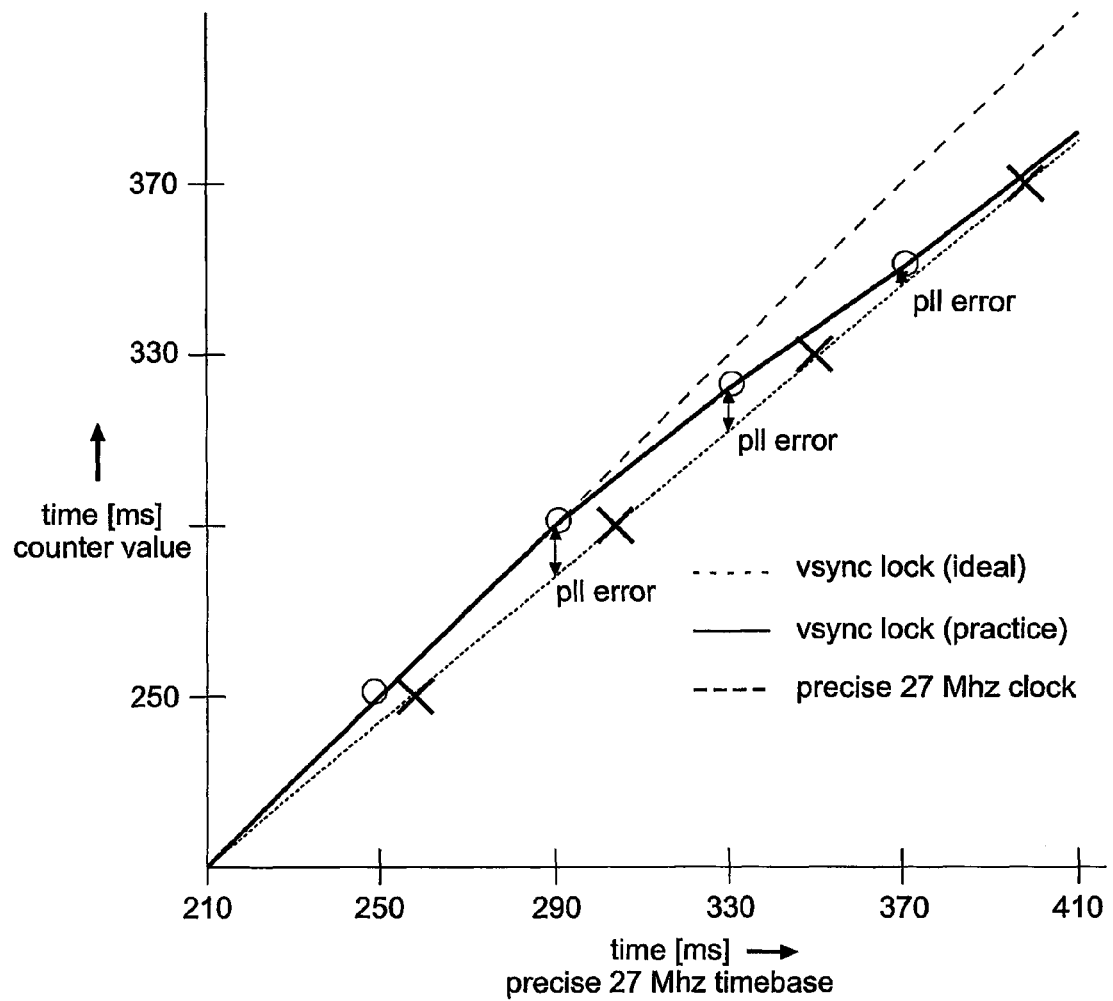
FIG. 9 illustrates the locking of a PLL to vsync.

By using an integrator, as is well known in the art, after some time, the PLL will have reached a stable situation with an error very close to zero. This is illustrated in FIG. 9. The solid line represents the value of the time-base counter as a function of the real time. Before t=290 ms, the time-base is free running at 27 MHz. After that, the PLL slows down the clock, and the time-base approaches the ideal vsync locked time-base (dotted). This ideal time-base ran at 40/46 of 27 MHz from the beginning. The crosses on the ideal curve show received PTS values normalized to the value of recPTS[0]. Once the PLL is locked, a situation is reached where, at playback, there is a time-base corrected output signal with vsync precisely equal to 25 Hz.

Storage Time Stamps

Since not all packets in the stream need to be associated with a PTS value and in certain applications it is desired to release packets from storage with exact time differences reflecting time differences of the packets before they were stored, frequently all packets are time stamped by the storage device. In such a way, the transport stream TS is transferred into a time-stamped transport stream TTS. The time stamping also uses the clock that is based on the PCR's. In fact, in the storage device the reconstructed PCR values could be sampled and used for time stamping received packets. Since the format of the PCR is not ideal for storage purposes, usually an additional TS counter is used. The modification of the PCR time base should now also be applied to the TS time base. In the embodiment where a PLL is used, this is now simple. The PLL clock steers the TS counter and this counter is sampled and added to a packet received by the storage device. All the processing in the storage device can be steered by using the PCR-locked main clock. All TS packets that come into the recorder are time-stamped from the TS timebase in the TS->TTS block. The resulting stream, called a time-stamped transport stream (TTS), contains 4 bytes of timestamp data and 188 bytes of video data per packet. At playback, the recorder uses a very precise 27 MHz clock, within the 30 ppm limits of MPEG. For each TS packet, the time-stamp that was added during recording is used to determine the time it has to be sent out in the TTS->TS block. This is done by comparing the time-stamp with a counter that is clocked by the 27 MHz clock. The TTS->TS block contains a sufficient amount of buffer memory to hold data that is not yet meant to go out.

In an alternative embodiment, in a system without a PLL the same equations (1) and (2) can now be applied for TS[k] instead of PCR[k]. It is required that there is already a TS coupled to the PCR's in the stream. This can be done in the following way. As in the conventional decoder/storage device, a clock is used that is locked to incoming PCR values, thus reconstructing the encoder clock. The packets are time-stamped using a counter driven by this clock. In such an embodiment, the incoming steam must be real-time, using an isochronous communication channel. The time stamps are then modified as described above. Again, this time base modification can be done off-line and need not be real-time.

In an embodiment, no incoming time stamps are used for the packets. Instead, the recording time stamp is estimated. This can be done at recording or playback from the storage. The storage already has modified PCR values. Packets that lie in between these PCR's are assigned a value based on these modified PCR's. A simple way of assigning a time is to use a proportional distribution over the time interval. So, if there are four packets in between two successive PCR's, the time in between the PCR's is divided into 5 equal period. Starting from the first PCR, each time when the period has elapsed, the next packet is released from storage.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device/system claims enumerating several means, several of these means may be embodied by one and the same item of hardware. The mere fact that certain measures are recited in mutually different dependent claims does not indicate that a combination of these measures cannot be used to advantage.

The invention claimed is:

1. A system for modifying a time-base of a digital video stream; the system including an encoding device and a storage device connected via a digital video communication system, and a decoder/renderer;

the encoding device including:
an input for receiving an input video signal, and an input frame signal (vsync) synchronous to and indicating frame boundaries in the input video signal;
an encoder for converting the input video signal and input frame signal to a corresponding digital video stream complying with a predetermined video encoding standard; the encoder including:
a encoder clock complying with the video encoding standard;
the digital video stream including:
a sequence of digital video frames corresponding to received input video frames; a sequence of program clock reference stamps (PCR) representing a clock signal of the encoder clock; and a sequence of video presentation time stamps (PTS) each associated with a respective digital video frame and representing a value of a counter driven by the clock signal at a moment of receipt of an input video frame that corresponds to the digital video frame; and
an output for providing the digital video stream via the digital video communication system;
the storage device including:
an input for receiving the digital video stream via the digital video communication system;
a time-base modifier operative to:
low-pass filter the received video presentation time stamps;
replace, in the digital video stream input to the storage device, the video presentation time stamps (PTS) by respective modified video presentation time stamps (M-PTS) based on a constant predetermined frame-time between successive presentation time stamps, and
replace the program clock reference stamps (PCR) by respective modified program clock reference stamps (M-PCR) by scaling the program clock reference stamps (PCR) using a scaling factor that depends on a ratio of an expected time between a video presentation time stamp j and a preceding video presentation time stamp j−n, where n is the time between the present presentation time stamp and the preceding presentation time stamp and an actual time between the video presentation time stamp j and the preceding video presentation time stamp j−n, where j·n>0, and the expected time is n times the predetermined frame time, thereby forming a time-base modified video stream, wherein a clock unit operative to generate a clock signal locked to the filtered video presentation time stamps (PTS) using an error signal that depends on the scaling factor; the modified program clock reference stamps (M-PCR) being obtained by sampling a counter driven by the clock signal at a moment of receipt of the program clock reference (PCR);
a storage for storing at least a part of the time-base modified video stream; and
an output for providing said part of the time-base modified video stream from the storage device to the decoder/renderer; and
the decoder/renderer including an input for receiving said part of the time-base modified video stream from the storage device and being operative to decode the time-base modified video stream received from the storage device to enable rendering of the digital video frames in the stream synchronous with the respective associated modified video presentation time stamps.

2. The system as claimed in claim 1, wherein the time-base modifier is operative to low-pass filter the scaling factor.

3. The system as claimed in claim 1, wherein the digital video stream includes information on a nominal frame rate of the video signal and the time-base modifier is operative to derive the predetermined frame time from the digital video stream.

4. The system as claimed in claim 1, wherein the input of the encoding device is operative to receive an analog audio signal; the encoding device further including a sampler for sampling the received analog audio signal under control of a sampling clock signal that is derived from the video input signal and locked onto the input frame signal (vsync); and wherein the encoder is operative to convert the sampled audio signal into a time sequence of corresponding audio frames and insert the audio frames and respective audio presentation time stamps (A-PTS) in the digital video signal stream.

5. The system as claimed in claim 4, wherein the time-base modifier is operative to replace the audio presentation time stamps (A-PTS) by modified audio presentation time stamps (MA-PTS) by scaling the audio presentation time stamps (A-PTS) using the scaling factor.

6. The system as claimed in claim 1, wherein the storage device is operative to time stamp each packet of the digital video stream on receipt of the packet; to store each time stamp in the storage in association with the corresponding received packet; and to output packets of the stored stream according to the respective time stamps and a predetermined delay.

7. The system as claimed in claim 6, wherein the storage device includes a clock for providing timing signals and the storage device being operative to use as the time stamps stored in the storage the timing signal scaled using the scaling factor.

8. The system as claimed in claim 1, wherein the storage device is operative to use as the time stamps stored in the storage a counter value from a counter driven by the clock signal locked to the received video presentation time stamps (PTS).

9. The system as claimed in claim 1, wherein the video encoding standard is MPEG2.

10. The system as claimed in claim 1, wherein the digital video communication system includes an isochronous communication channel for transferring the digital video stream.

11. A hardware storage device for use in a receiving system; the storage device including:
an input for receiving a digital video stream complying with a predetermined video encoding standard via a digital video communication system; the digital video stream including: a sequence of digital video frames; a sequence of program clock reference stamps (PCR) representing a clock signal of an encoder clock; and a sequence of video presentation time stamps (PTS) each associated with a respective digital video frame;
a time-base modifier operative to:
low-pass filter the received video presentation time stamps;
replace the video presentation time stamps (PTS) by respective modified video presentation time stamps (M-PTS) based on a constant predetermined frame time between successive presentation time stamps; and
replace the program clock reference stamps (PCR) by respective modified program clock reference stamps (M-PCR) by scaling the program clock reference stamps (PCR) using a scaling factor that depends on a ratio of an expected time between a video presentation time stamp j and a preceding video presentation time stamp j−n, where n is the time between the present presentation time stamp and the preceding presentation time stamp and an actual time between the video presentation time stamp j and the preceding video presentation time stamp j−n, where j·n>0, and the expected time is n times the predetermined frame time, wherein a clock unit operative to generate a clock signal locked to the filtered video presentation time stamps (PTS) using an error signal that depends on the scaling factor; the modified program clock reference stamps (M-PCR) being obtained by sampling a counter driven by the clock signal at a moment of receipt of the program clock reference (PCR);
a storage for storing at least a part of the time-base modified video stream; and
an output for providing a video stream from the storage device.

12. A method, executable on a processor, device for modifying a time-base of a digital video stream that complies with a predetermined video encoding standard and includes a sequence of digital video frames, a sequence of program clock reference stamps (PCR) representing a clock signal of an encoder clock, and a sequence of video presentation time stamps (PTS) each associated with a respective digital video frame; the method including:
low-pass filtering the received video presentation time stamps;
replacing the video presentation time stamps (PTS) by respective modified video presentation time stamps (M-PTS) based on a constant predetermined frame time between successive presentation time stamps; and
replacing the program clock reference stamps (PCR) by respective modified program clock reference stamps (M-PCR) by scaling the program clock reference stamps (PCR) using a scaling factor that depends on a ratio of an expected time between a video presentation time stamp j and a preceding video presentation time stamp j−n, where n is the time between the present presentation time stamp and the preceding presentation time stamp and an actual time between the video presentation time stamp j and the preceding video presentation time stamp j−n, where j·n>0, and the expected time is n times the predetermined frame time; and
locking a clock signal to the filtered received video presentation time stamps (PTS) using an error signal that depends on the scaling factor; the modified program clock reference stamps (M-PCR) being obtained by sampling a counter driven by the clock signal at a moment of receipt of the program clock reference (PCR).

13. A computer program hardware product with variations of physical properties that interact with processing apparatus and are operative to cause a processor of the processing apparatus to perform a method for modifying a time-base of a digital video stream that complies with a predetermined video encoding standard and includes a sequence of digital video frames, a sequence of program clock reference stamps (PCR) representing a clock signal of an encoder clock, and a sequence of video presentation time stamps (PTS) each associated with a respective digital video frame, the method comprising:
low-pass filtering the received video presentation time stamps present in a video stream;
replacing the received video presentation time stamps (PTS) by respective modified video presentation time stamps (M-PTS) based on a constant predetermined frame time between successive presentation time stamps; and
replacing program clock reference stamps (PCR) by respective modified program clock reference stamps (M-PCR) by scaling the program clock reference stamps (PCR) using a scaling factor that depends on a ratio of an expected time between a video presentation time stamp j and a preceding video presentation time stamp j−n, where n is the time between the present presentation time stamp and the preceding presentation time stamp and an actual time between the video presentation time stamp j and the preceding video presentation time stamp j−n, where j· n>0, and the expected time is n times the predetermined frame time; and
locking a clock signal to the filtered video presentation time stamps (PTS) using an error signal that depends on the scaling factor; the modified program clock reference stamps (M-PCR) being obtained by sampling a counter driven by the clock signal at a moment of receipt of the program clock reference (PCR).

* * * * *